(12) United States Patent
Archer et al.

(10) Patent No.: US 9,807,132 B2
(45) Date of Patent: *Oct. 31, 2017

(54) COLLECTIVE OPERATION MANAGEMENT IN A PARALLEL COMPUTER

(71) Applicant: INTERNATIONAL BUSINESS MACHINES CORPORATION, Armonk, NY (US)

(72) Inventors: Charles J. Archer, Rochester, MN (US); James E. Carey, Rochester, MN (US); Philip J. Sanders, Rochester, MN (US); Brian E. Smith, Knoxville, TN (US)

(73) Assignee: International Business Machines Corporation, Armonk, NY (US)

( * ) Notice: Subject to any disclaimer, the term of this patent is extended or adjusted under 35 U.S.C. 154(b) by 210 days.

This patent is subject to a terminal disclaimer.

(21) Appl. No.: 13/803,461

(22) Filed: Mar. 14, 2013

(65) Prior Publication Data

US 2014/0280820 A1    Sep. 18, 2014

Related U.S. Application Data

(63) Continuation of application No. 13/795,213, filed on Mar. 12, 2013.

(51) Int. Cl.
  *G06F 15/16*    (2006.01)
  *H04L 29/06*    (2006.01)
  (Continued)

(52) U.S. Cl.
  CPC .......... *H04L 65/403* (2013.01); *G06F 9/5094* (2013.01); *H04L 41/32* (2013.01); *Y02B 60/142* (2013.01)

(58) Field of Classification Search
  CPC .................. H04L 65/40; H04L 41/32
  See application file for complete search history.

(56) References Cited

U.S. PATENT DOCUMENTS

6,308,251 B1 * 10/2001 Hashiguchi ......... G06F 15/8015
                                                712/10
7,958,183 B2    6/2011 Arimilli et al.
(Continued)

OTHER PUBLICATIONS

Qian, et al., "Process Arrival Pattern and Shared Memory Aware Alltoall on InfiniBand", Proceedings of the 16th European PVM/MPI Users' Group Meeting on Recent Advances in Parallel Virtual Machine and Message Passing Interface, Sep. 2009, pp. 250-260, Springer-Verlag Berlin, Heidelberg, ISBN: 978-3-642-03769-6.
(Continued)

*Primary Examiner* — Brian Whipple
*Assistant Examiner* — Anthony Rotolo
(74) *Attorney, Agent, or Firm* — Brandon C. Kennedy; Grant A. Johnson; Kennedy Lenart Spraggins LLP

(57) ABSTRACT

Methods, apparatuses, and computer program products for collective operation management in a parallel computer are provided. Embodiments include a parallel computer having a plurality of compute nodes coupled for data communications over a data communications network. Embodiments include a first compute node entering a collective operation. Each compute node of the plurality of compute nodes is associated with the collective operation. In response to entering the collective operation, the first compute node decreases power consumption of the first compute node.

4 Claims, 10 Drawing Sheets

(51) Int. Cl.
*H04L 12/24* (2006.01)
*G06F 9/50* (2006.01)

(56) References Cited

U.S. PATENT DOCUMENTS

| | | |
|---|---|---|
| 2002/0120741 A1* | 8/2002 | Webb et al. .................. 709/225 |
| 2005/0268106 A1* | 12/2005 | Mansell .................. G06F 13/24 |
| | | 713/182 |
| 2009/0049313 A1* | 2/2009 | Gooding ............... G06F 1/3203 |
| | | 713/300 |
| 2009/0235263 A1* | 9/2009 | Furukawa ..................... 718/102 |
| 2010/0241884 A1* | 9/2010 | Barsness et al. ............. 713/322 |
| 2011/0239010 A1* | 9/2011 | Jain ....................... G06F 1/3209 |
| | | 713/310 |

OTHER PUBLICATIONS

Faraj, et al., "A Study of Process Arrival Patterns for MPI Collective Operations", In ICS'07: Proceedings of the 21st Annual International Conference on Supercomputing, Jun. 2007, pp. 168-179, ACM New York, NY, USA, ISBN: 978-1-59593-768-1.

Patarasuk, et al., "Efficient MPI_Bcast Across Different Process Arrival Patterns", IEEE International Symposium on Parallel and Distributed Processing, Apr. 14-18, 2008, pp. 1-11, IEEE, Digital Object Identifier : 10.1109/IPDPS.2008.4536308.

* cited by examiner

COLLECTIVE OPERATION MANAGEMENT IN A PARALLEL COMPUTER

CROSS-REFERENCE TO RELATED APPLICATION

This application is a continuation application of and claims priority from U.S. patent application Ser. No. 13/795,213, filed on Mar. 12, 2013.

BACKGROUND OF THE INVENTION

Field of the Invention

The field of the invention is data processing, or, more specifically, methods, apparatuses, and computer program products for collective operation management in a parallel computer.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Current parallel computers are running a number of processes that just a few years ago would have seemed unimaginable. For example, modern parallel computer can execute millions of processes simultaneously. With so many processes executing, the number of available geometries for collective operations and algorithms for collective operations are extremely large. Selecting an appropriate geometry, selecting an optimized algorithm, and performing other administrative tasks associated with executing a collective operation can be resource intensive.

SUMMARY OF THE INVENTION

Methods, apparatuses, and computer program products for collective operation management in a parallel computer are provided. Embodiments include a parallel computer having a plurality of compute nodes coupled for data communications over a data communications network. Embodiments also include a first compute node of a plurality of compute nodes entering a collective operation. Each compute node of the plurality of compute nodes is associated with the collective operation. In response to entering the collective operation, the first compute node decreases power consumption of the first compute node.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
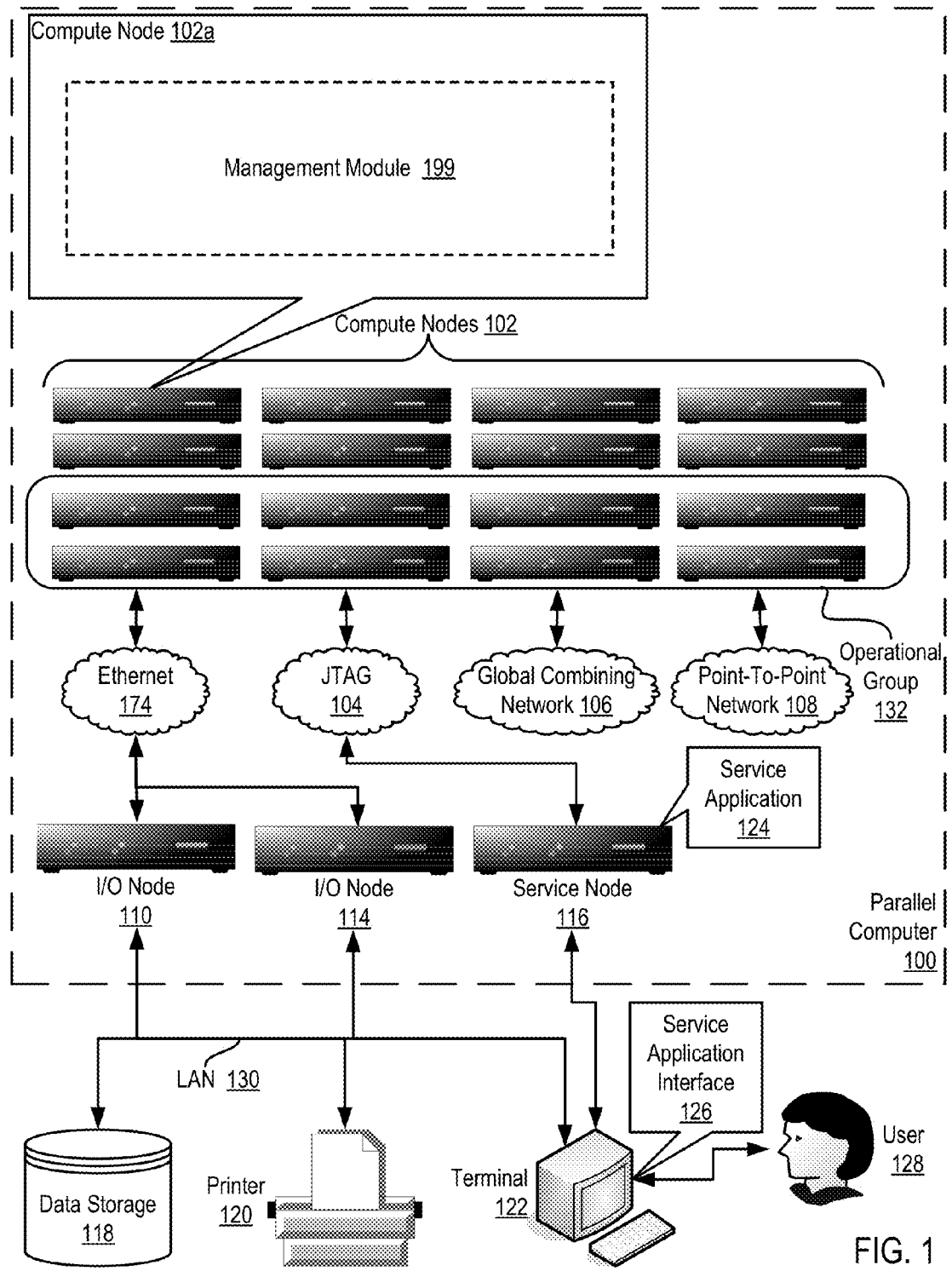
FIG. 1 illustrates an example system for collective operation management in a parallel computer according to embodiments of the present invention.

Example methods, apparatuses, and computer program products for collective operation management in a parallel computer in accordance with the present invention are described with reference to the accompanying drawings, beginning with FIG. 1. FIG. 1 illustrates an example system for collective operation management in a parallel computer according to embodiments of the present invention. The system of FIG. 1 includes a parallel computer (100), non-volatile memory for the computer in the form of a data storage device (118), an output device for the computer in the form of a printer (120), and an input/output device for the computer in the form of a computer terminal (122).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of an operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use in systems configured according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root compute node.

A reduction operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the receive buffer of a root process. Application specific reduction operations can be defined at runtime. Parallel communications libraries may support predefined operations. MPI, for example, provides the following predefined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

The parallel computer (100) of FIG. 1 operates generally for collective operation management, the parallel computer including a plurality of compute nodes (100). Such a parallel computer (100) is typically composed of many compute nodes, but for ease of explanation one of the compute nodes (102a) in this example are referenced in particular. The compute node (102a) includes a management module (199) for collective operation management in a parallel computer, the parallel computer including a plurality of compute nodes (100). The management module (199) of FIG. 1 may be embodied as a module of computer program instructions executing on computer hardware. The management module (199) of FIG. 1 can implement collective operation management in a parallel computer (100) by: entering a collective operation and in response to entering the collective operation, decreasing power consumption of the first compute node.

The arrangement of nodes, networks, and I/O devices making up the example apparatus illustrated in FIG. 1 are for explanation only, not for limitation of the present invention. Systems configured for collective operation management in a parallel computer according to embodiments of the present invention may include additional nodes, networks, devices, and architectures, not shown in FIG. 1, as will occur to those of skill in the art. The parallel computer (100) in the example of FIG. 1 includes sixteen compute nodes (102). Parallel computers (102) configured for collective operation management, according to embodiments of the present invention, sometimes include thousands of compute nodes. In addition to Ethernet (174) and JTAG (104), networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Collective operation management in a parallel computer according to embodiments of the present invention is generally implemented on a parallel computer that includes a plurality of compute nodes organized for collective operations through at least one data communications network. In fact, such computers may include thousands of such compute nodes. Each compute node is in turn itself a kind of computer composed of one or more computer processing cores, its own computer memory, and its own input/output adapters. For further explanation, therefore, FIG. 2 sets forth a block diagram of an example compute node (102) useful in collective operation management in a parallel computer according to embodiments of the present invention. The compute node (102) of FIG. 2 includes a plurality of processing cores (165) as well as RAM (156). The processing cores (165) of FIG. 2 may be configured on one or more integrated circuit dies. Processing cores (165) are connected to RAM (156) through a high-speed memory bus (155) and through a bus adapter (194) and an extension bus (168) to other components of the compute node.

Stored in RAM (156) is a parallel communications library (161), a library of computer program instructions that carry out parallel communications among compute nodes, including point-to-point operations as well as collective operations. A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the MPI library and the 'Parallel Virtual Machine' ('PVM') library.

Also stored in RAM (156) is an operating system (162), a module of computer program instructions and routines for an application program's access to other resources of the compute node. It is typical for the parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Windows XP™, AIX™, IBM's i5/OS™, and others as will occur to those of skill in the art.

Also stored in RAM (156) is a management module (199) for use in collective operation management in a parallel computer (100). The management module (199) of FIG. 2 includes computer program instructions that, when executed, can be used for collective operation management in a parallel computer (100). Specifically, a management module on a root node may be configured to entering a collective operation and in response to entering the collective operation, decreasing power consumption of the first compute node.

Figure 2:
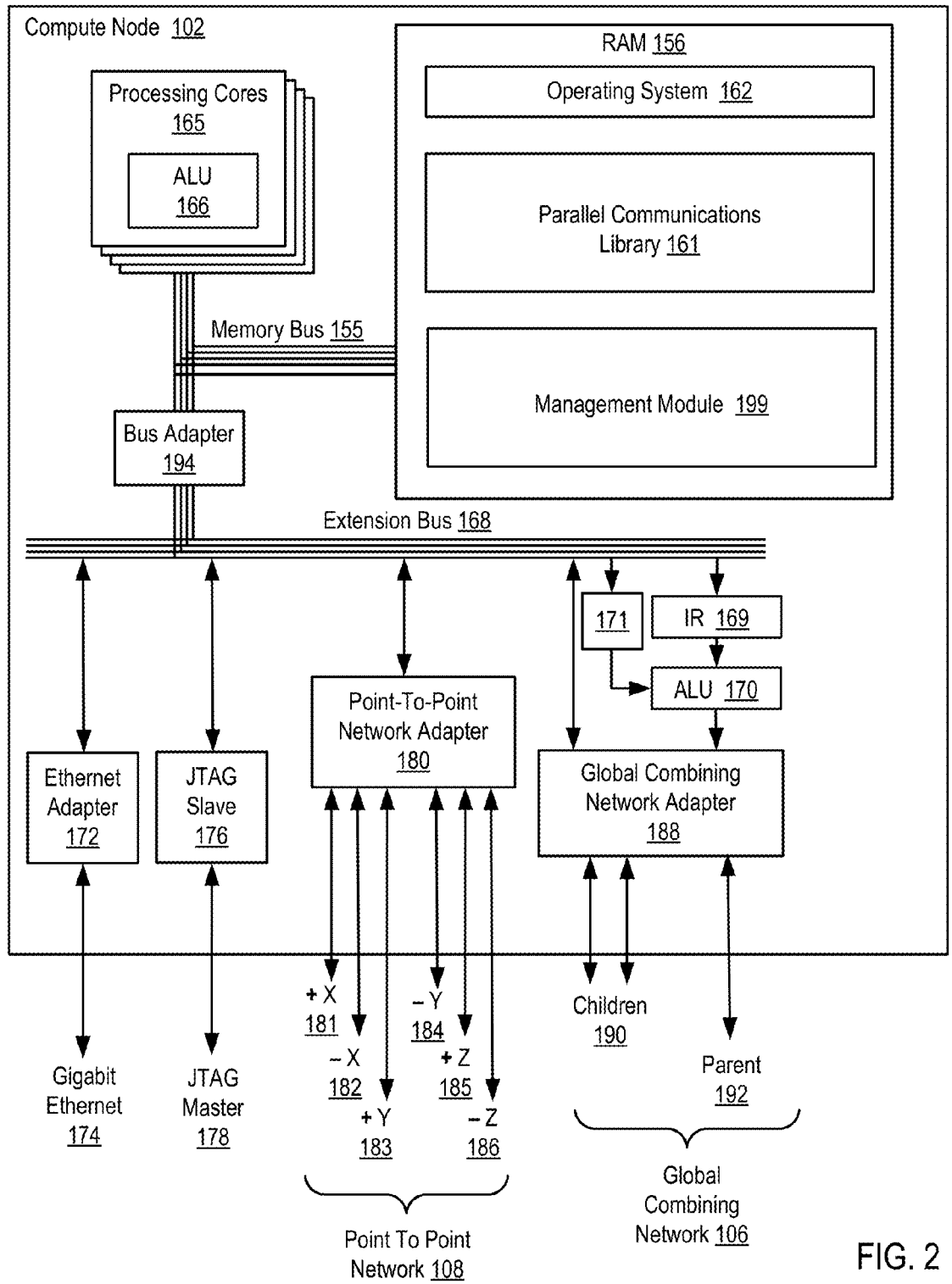
FIG. 2 sets forth a block diagram of an example compute node useful in a collective operation management in a parallel computer according to embodiments of the present invention.

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus useful for collective operation management in a parallel computer include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient alternative access point into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes useful in systems for collective operation management in a parallel computer according to embodiments of the present invention.

The data communications adapters in the example of FIG. 2 include a Point-To-Point Network Adapter (180) that couples example compute node (102) for data communications to a network (108) for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3A:
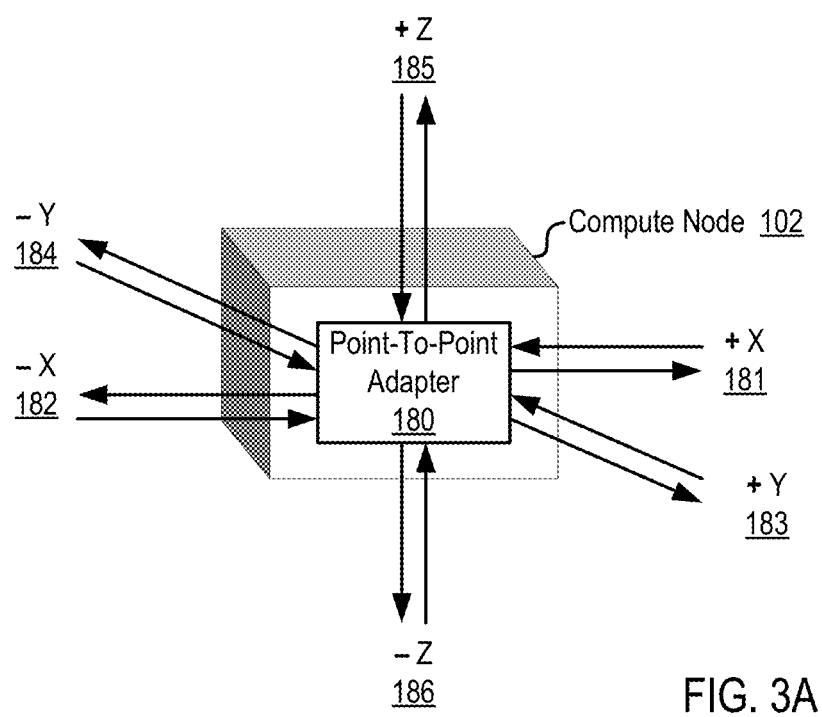
FIG. 3A sets forth a block diagram of an example Point-To-Point Adapter useful in systems for collective operation management in a parallel computer according to embodiments of the present invention.

For further explanation, FIG. 3A sets forth a block diagram of an example Point-To-Point Adapter (180) useful in systems for collective operation management in a parallel computer according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3A provides data communication along an x-axis through four unidirectional data communications links, to and from the next node in the −x direction (182) and to and from the next node in the +x direction (181). The Point-To-Point Adapter (180) of FIG. 3A also provides data communication along a y-axis through four unidirectional data communications links, to and from the next node in the −y direction (184) and to and from the next node in the +y direction (183). The Point-To-Point Adapter (180) of FIG. 3A also provides data communication along a z-axis through four unidirectional data communications links, to and from the next node in the −z direction (186) and to and from the next node in the +z direction (185).

Figure 3B:
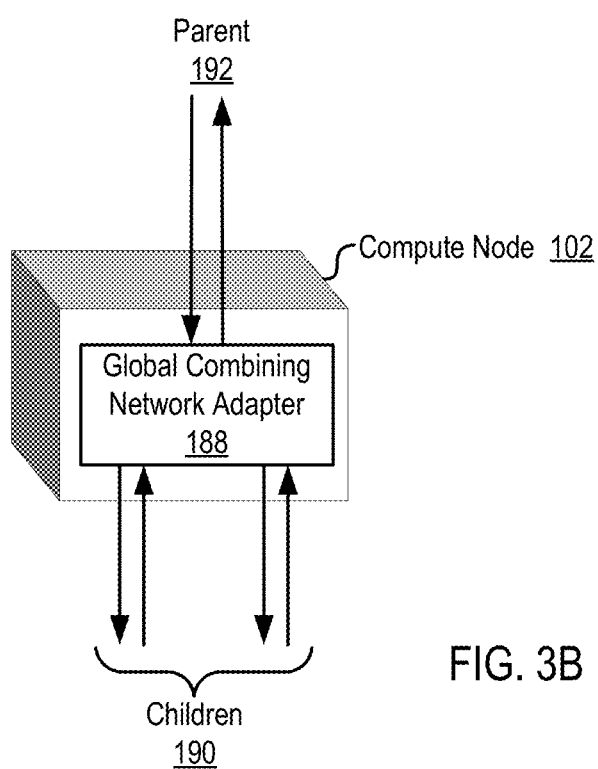
FIG. 3B sets forth a block diagram of an example Global Combining Network Adapter useful in systems for collective operation management in a parallel computer according to embodiments of the present invention.

For further explanation, FIG. 3B sets forth a block diagram of an example Global Combining Network Adapter (188) useful in systems for collective operation management in a parallel computer according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from children nodes of a global combining network through four unidirectional data communications links (190), and also provides data communication to and from a parent node of the global combining network through two unidirectional data communications links (192).

Figure 4:
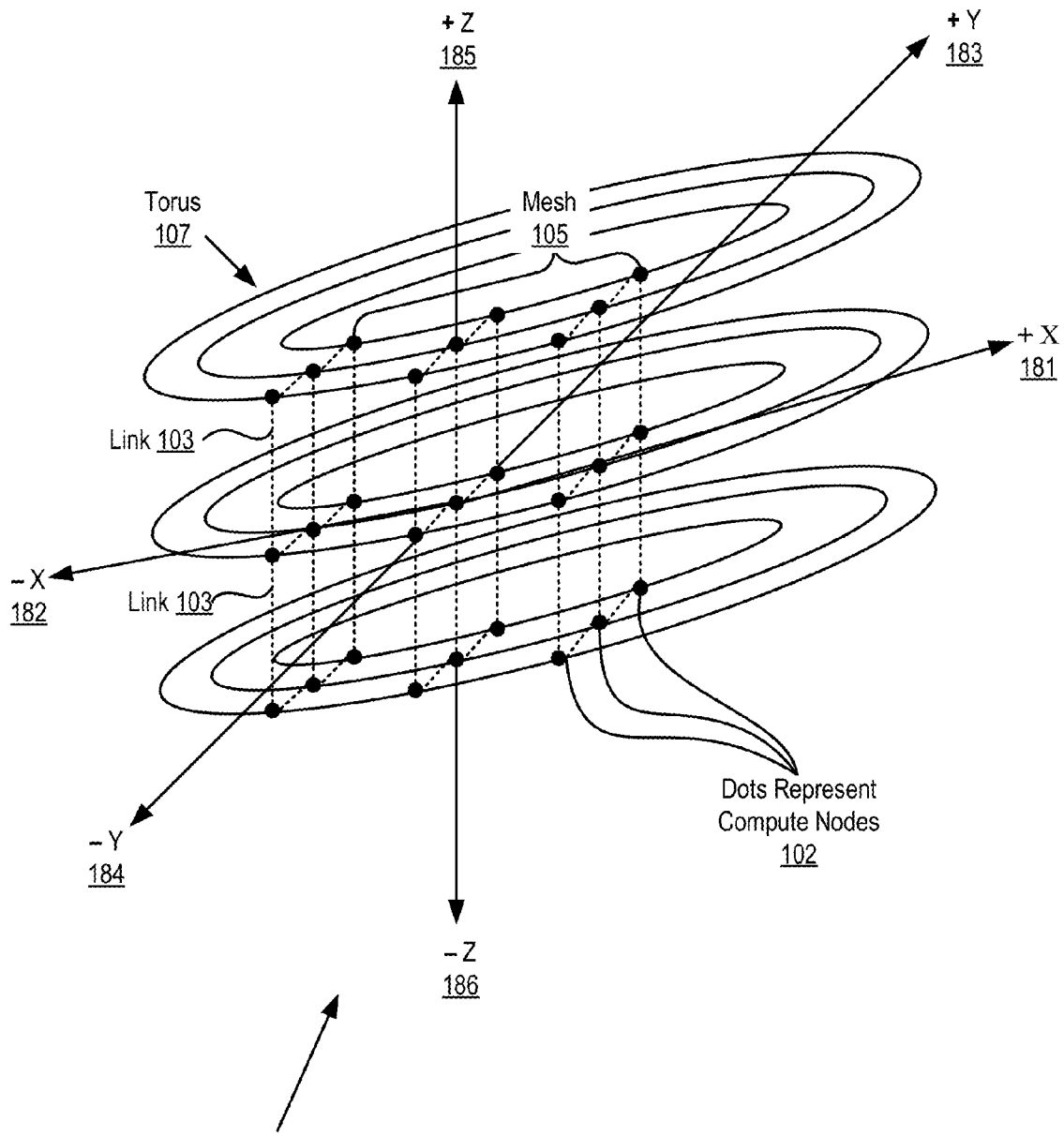
FIG. 4 sets forth a line drawing illustrating an example data communications network optimized for point-to-point operations useful in systems capable of collective operation management in a parallel computer according to embodiments of the present invention.

For further explanation, FIG. 4 sets forth a line drawing illustrating an example data communications network (108) optimized for point-to-point operations useful in systems capable of collective operation management in a parallel computer according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and from in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations for use in collective operation management in a parallel computer in accordance with embodiments of the present invention may contain only a few compute nodes or may contain thousands of compute nodes. For ease of explanation, the data communications network of FIG. 4 is illustrated with only three dimensions, but readers will recognize that a data communications network optimized for point-to-point operations for use in collective operation management in a parallel computer in accordance with embodiments of the present invention may in fact be implemented in two dimensions, four dimensions, five dimensions, and so on. Several supercomputers now use five dimensional mesh or torus networks, including, for example, IBM's Blue Gene Q™.

Figure 5:
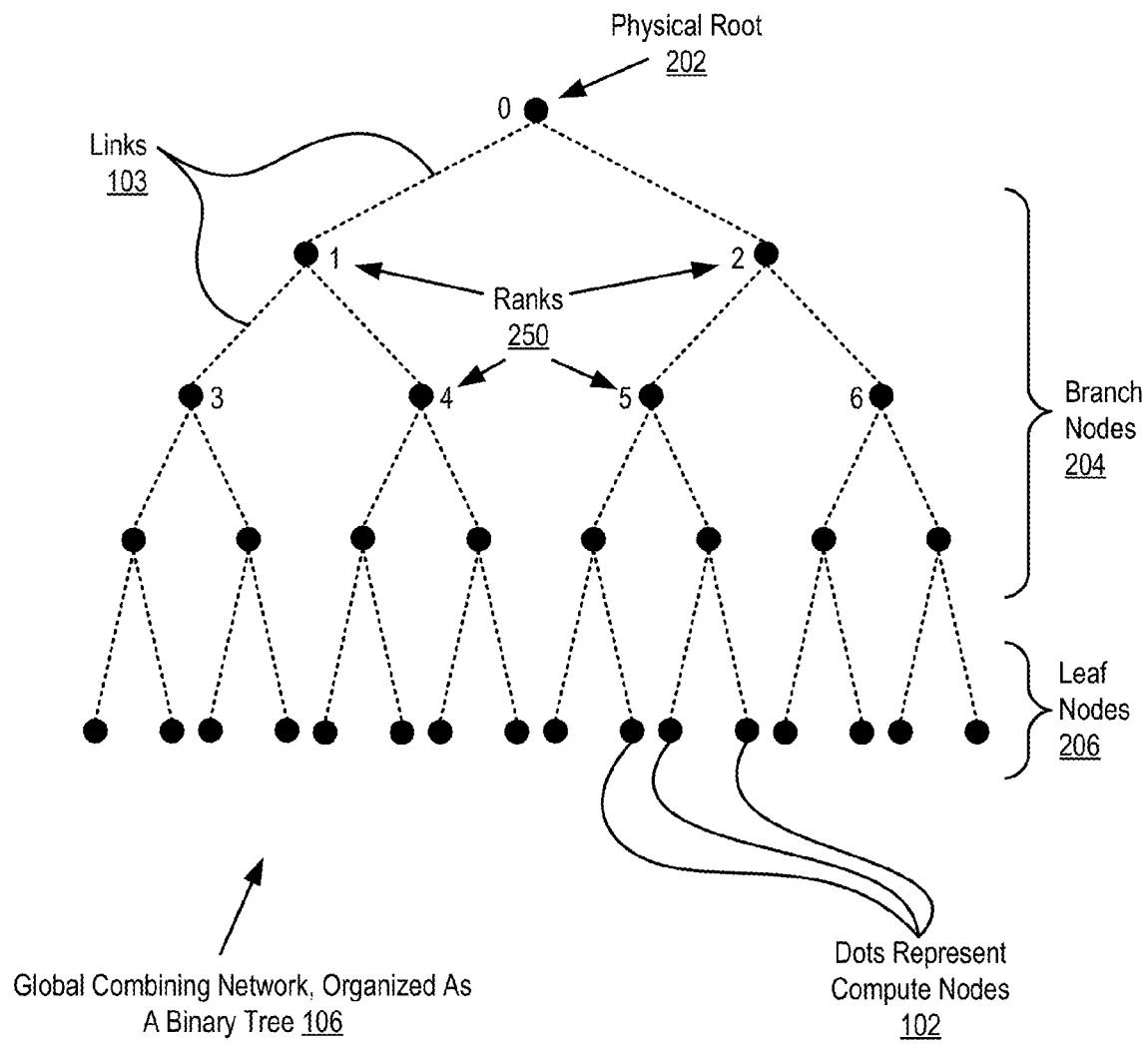
FIG. 5 sets forth a line drawing illustrating an example global combining network useful in systems capable of collective operation management in a parallel computer according to embodiments of the present invention.

For further explanation, FIG. 5 sets forth a line drawing illustrating an example global combining network (106) useful in systems capable of collective operation management in a parallel computer according to embodiments of the present invention. The example data communications network of FIG. 5 includes data communications links (103) connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network (106) may be characterized as a physical root compute node (202), branch nodes (204), and leaf nodes (206). The physical root (202) has two children but no parent and is so called because the physical root compute node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network (106) optimized for collective operations for use in collective operation management in a parallel computer in accordance with embodiments of the present invention may contain only a few compute nodes or may contain thousands of compute nodes.

In the example of FIG. 5, each node in the tree is assigned a unit identifier referred to as a 'rank' (250). The rank actually identifies a task or process that is executing a parallel operation. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root compute node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
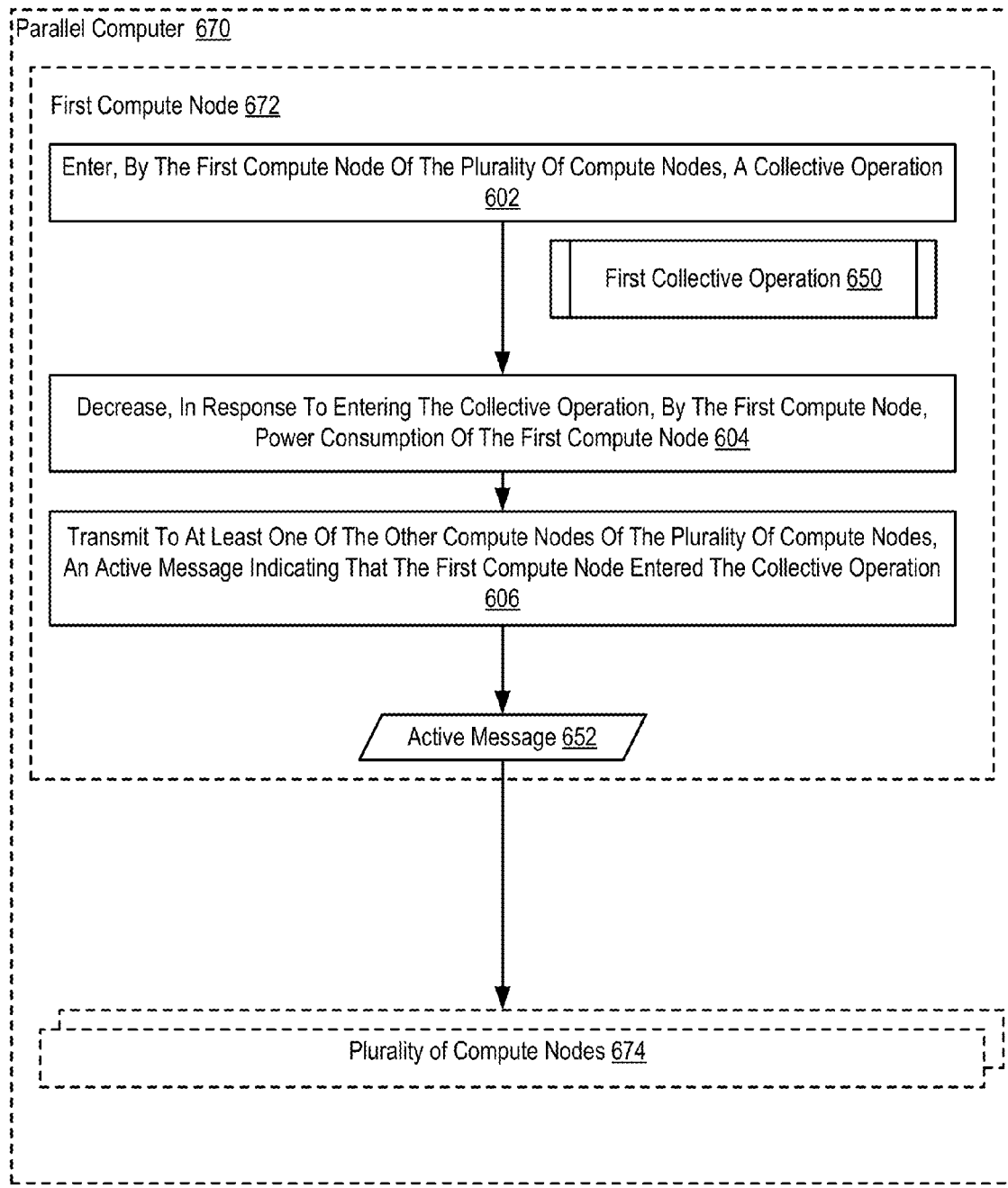
FIG. 6 sets forth a flow chart illustrating an example method for collective operation management in a parallel computer according to embodiments of the present invention.

For further explanation, FIG. 6 sets forth a flow chart illustrating an example method for collective operation management in a parallel computer (670) according to embodiments of the present invention. In the example of FIG. 6, the parallel computer includes a plurality (674) of compute nodes coupled for data communications over a data communications network and each compute node of the plurality of compute nodes (672) is associated with the collective operation (650).

The method of FIG. 6 includes a first compute node (672) entering (602) a collective operation (650). Entering (602) a collective operation (650) may be carried out by reaching a particular execution point within a collective operation, for example, a starting barrier.

The method of FIG. 6 also includes the first compute node (672) decreasing (604) power consumption of the first compute node (672) in response to entering the collective operation (650). Decreasing (604) power consumption of the first compute node (672) in response to entering the collective operation (650) may be carried out by transmitting a message to a service node instructing the service node to reduce power consumption of the first compute node. The service node may reduce the power consumption of the first compute node by throttling processor speed, throttling processor operating voltages, and throttling memory bus speeds.

The method of FIG. 6 also includes the first compute node (672), transmitting (606) to at least one of the other compute nodes of the plurality (674) of compute nodes, in response to entering the collective operation (650), an active message (652) indicating that the first compute node (672) entered the collective operation (650). Transmitting (606) to at least one of the other compute nodes an active message (652) indicating that the first compute node (672) entered the collective operation (650) may be carried out by identifying a plurality of compute nodes in an operational group that is associated with a collective operation; and sending a message to one or more of the identified compute nodes.

Figure 7:
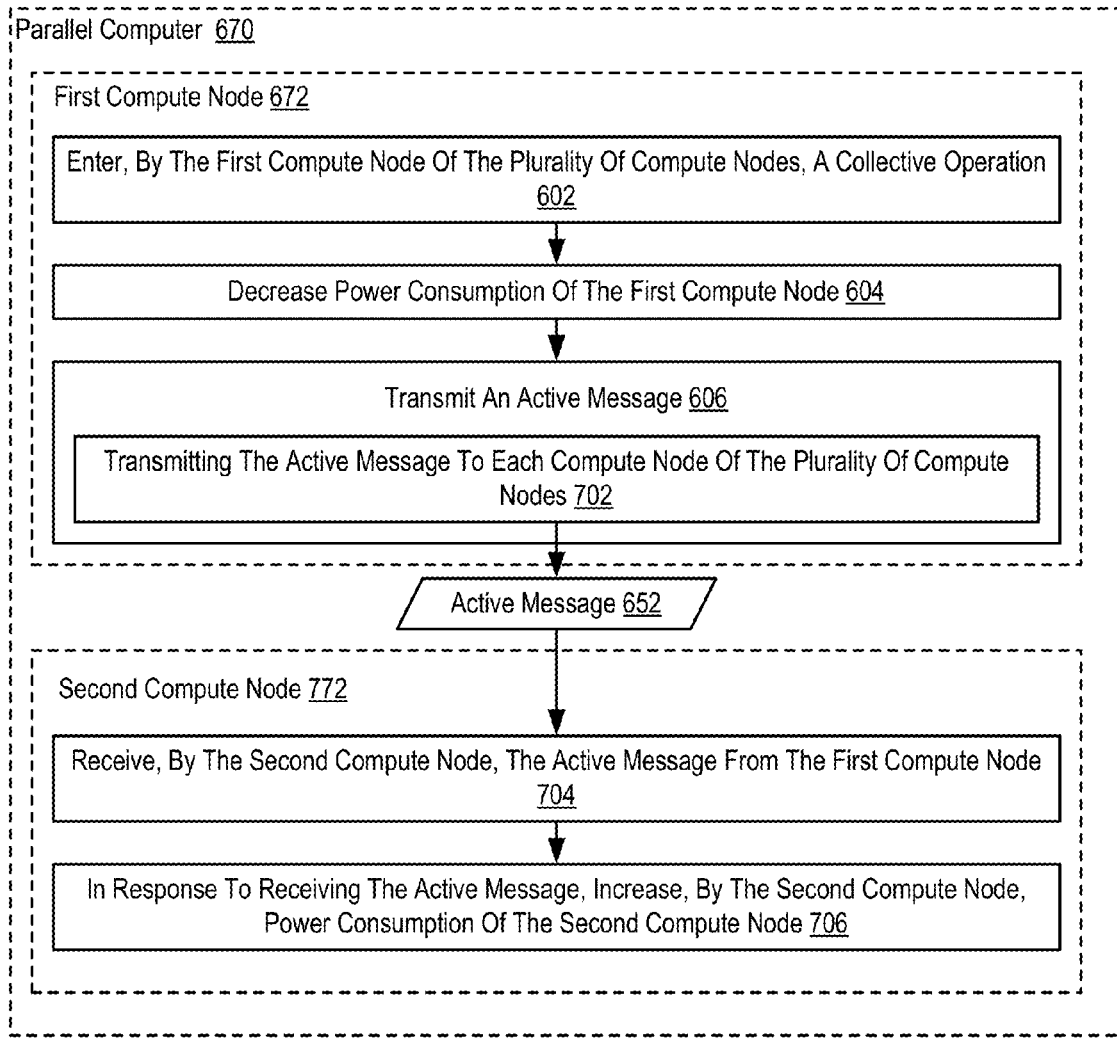
FIG. 7 sets forth a flow chart illustrating an additional example method for collective operation management in a parallel computer according to embodiments of the present invention.

For further explanation, FIG. 7 sets forth a flow chart illustrating another example method for collective operation management in a parallel computer (670) according to embodiments of the present invention. The method of FIG. 7 is similar to the method of FIG. 6 in that the method of FIG. 7 also includes a first compute node (672) entering (602) a collective operation (650); the first compute node (672) decreasing (604) power consumption of the first compute node (672) in response to entering the collective operation (650); and transmitting (606) to at least one of the other compute nodes of the plurality (674) of compute nodes, an active message (652) indicating that the first compute node (672) entered the collective operation (650).

In the method of FIG. 7, however, transmitting (606) to at least one of the other compute nodes, an active message (652) indicating that the first compute node (672) entered the collective operation (650) includes the first compute node (674) transmitting (702) the active message (652) to each of the other compute node of the plurality (674) of compute nodes. Transmitting (702) the active message (652) to each of the other compute node of the plurality (674) of compute nodes may be carried out by identifying a plurality of compute nodes in an operational group that is associated with a collective operation; and sending a message to each of the identified compute nodes.

The method of FIG. 7 also includes a second compute node (772) of the plurality (674) of compute nodes receiving (704) the active message (652) from the first compute node (674). Receiving (704) the active message (652) from the first compute node (674) may be carried out by receiving the active message via a data communications network.

The method of FIG. 7 also includes a second compute node (772) increasing (706), power consumption of the second compute node (772) in response to receiving the active message (652). Increasing (706), power consumption of the second compute node (772) in response to receiving the active message (652) may be carried out by transmitting a message to a service node instructing the service node to increase power consumption of the compute node. The service node may increase the power consumption of a particular compute node by throttling-up the processor speed of the compute node. That is, the service compute node may allocate power amongst the compute nodes in the tree data communications network so as to increase performance of the 'slowest' compute nodes while only marginally decreasing performance of the 'fastest' compute nodes.

Figure 8:
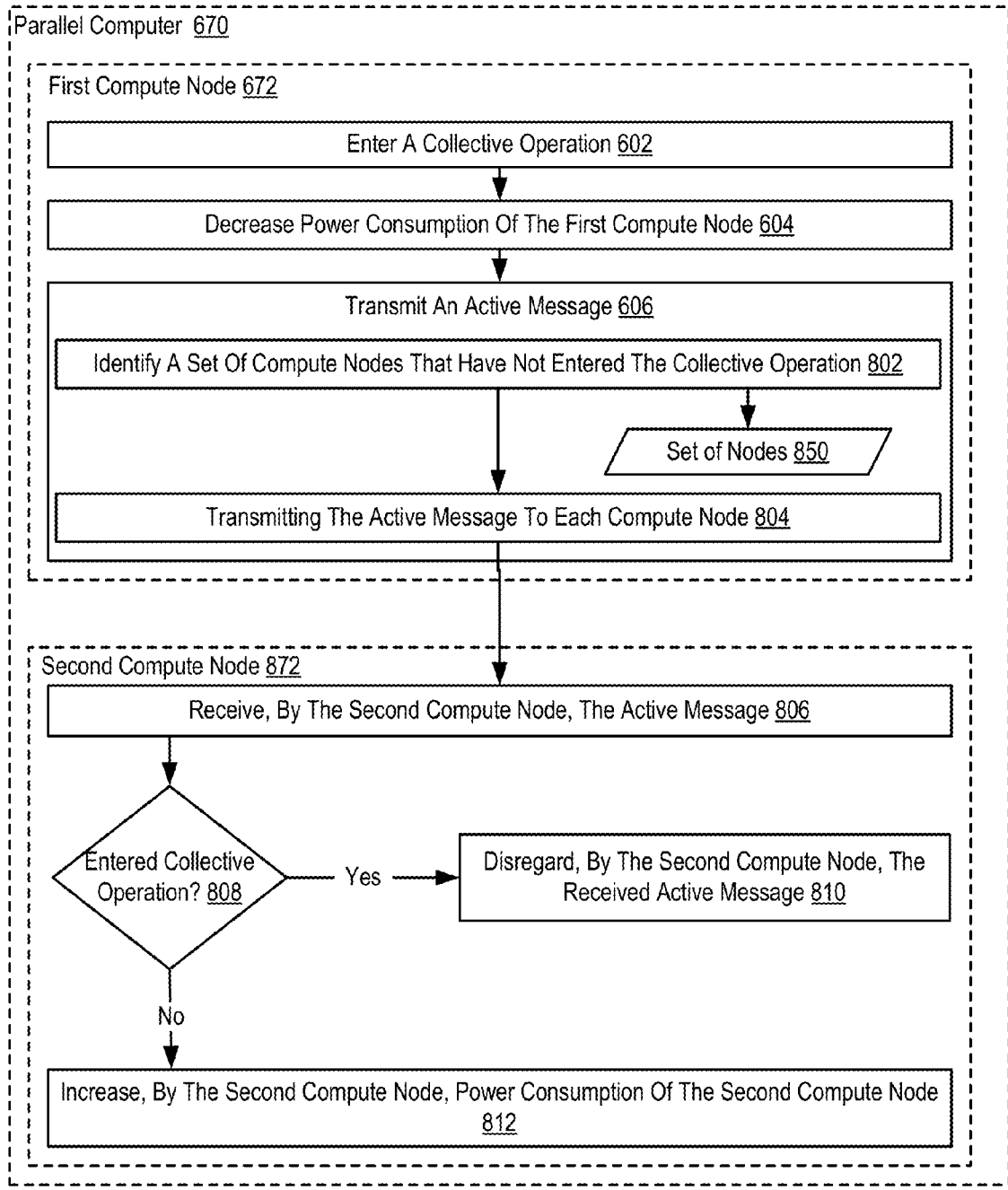
FIG. 8 sets forth a flow chart illustrating an additional example method for collective operation management in a parallel computer according to embodiments of the present invention.

For further explanation, FIG. 8 sets forth a flow chart illustrating another example method for collective operation management in a parallel computer (670) according to embodiments of the present invention. The method of FIG. 8 is similar to the method of FIG. 6 in that the method of FIG. 8 also includes a first compute node (672) entering (602) a collective operation (650); the first compute node (672) decreasing (604) power consumption of the first compute node (672) in response to entering the collective operation (650); and transmitting (606) to at least one of the other compute nodes of the plurality (674) of compute nodes, an active message (652) indicating that the first compute node (672) entered the collective operation (650).

In the method of FIG. 8, however, transmitting (606) to at least one of the other compute nodes, an active message (652) indicating that the first compute node (672) entered the collective operation (650) includes the first compute node (672) identifying (802) a set (850) of compute nodes that have not entered the collective operation (650). Identifying (802) a set (850) of compute nodes that have not entered the collective operation (650) may be carried out by determining which compute nodes of the plurality of computer nodes have entered the collective operation; and based on the determination, identifying the compute nodes that have not entered the collective operation.

In the method of FIG. 8, however, transmitting (606) to at least one of the other compute nodes, an active message (652) indicating that the first compute node (672) entered the collective operation (650) includes the first compute node (672) transmitting (804) the active message (652) to the identified set (850) of compute nodes. Transmitting (804) the active message (652) to the identified set (850) of compute nodes may be carried out by sending a message via the data communications network to each of the identified compute nodes.

The method of FIG. 8 also includes a second compute node (872) of the plurality (674) of compute nodes receiving (806) the active message (652) from the first compute node (672). Receiving (806) the active message (652) from the first compute node (672) may be carried out by receiving the active message via a data communications network.

The method of FIG. 8 also includes the second compute node (872) determining (808) whether the second compute node (872) has entered the collective operation (652). Determining (808) whether the second compute node (872) has entered the collective operation (652) may be carried out by keeping track of the status of the processor tasks including the status of the collective operation.

If the second compute node (872) has entered the collective operation (652), the method of FIG. 8 continues by the second compute node (872) disregarding (810) the received active message (652). Disregarding (810) the received active message (652) may be carried out by marking the active message as no-action.

If the second compute node (872) has not entered the collective operation (652), the method of FIG. 8 continues by increasing (812) power consumption of the second compute node (872). Increasing (812) power consumption of the second compute node (872) may be carried out by transmitting a message to a service node instructing the service node to increase power consumption of the child compute node. The service node may increase the power consumption of a particular compute node by throttling-up the processor speed of the compute node. That is, the service compute node may allocate power amongst the compute nodes in the tree data communications network so as to increase performance of the 'slowest' compute nodes while only marginally decreasing performance of the 'fastest' compute nodes. In a particular embodiment, the second compute node (872) increases the power consumption of the second compute (872) by an amount that is based on a number of active messages received.

Figure 9:
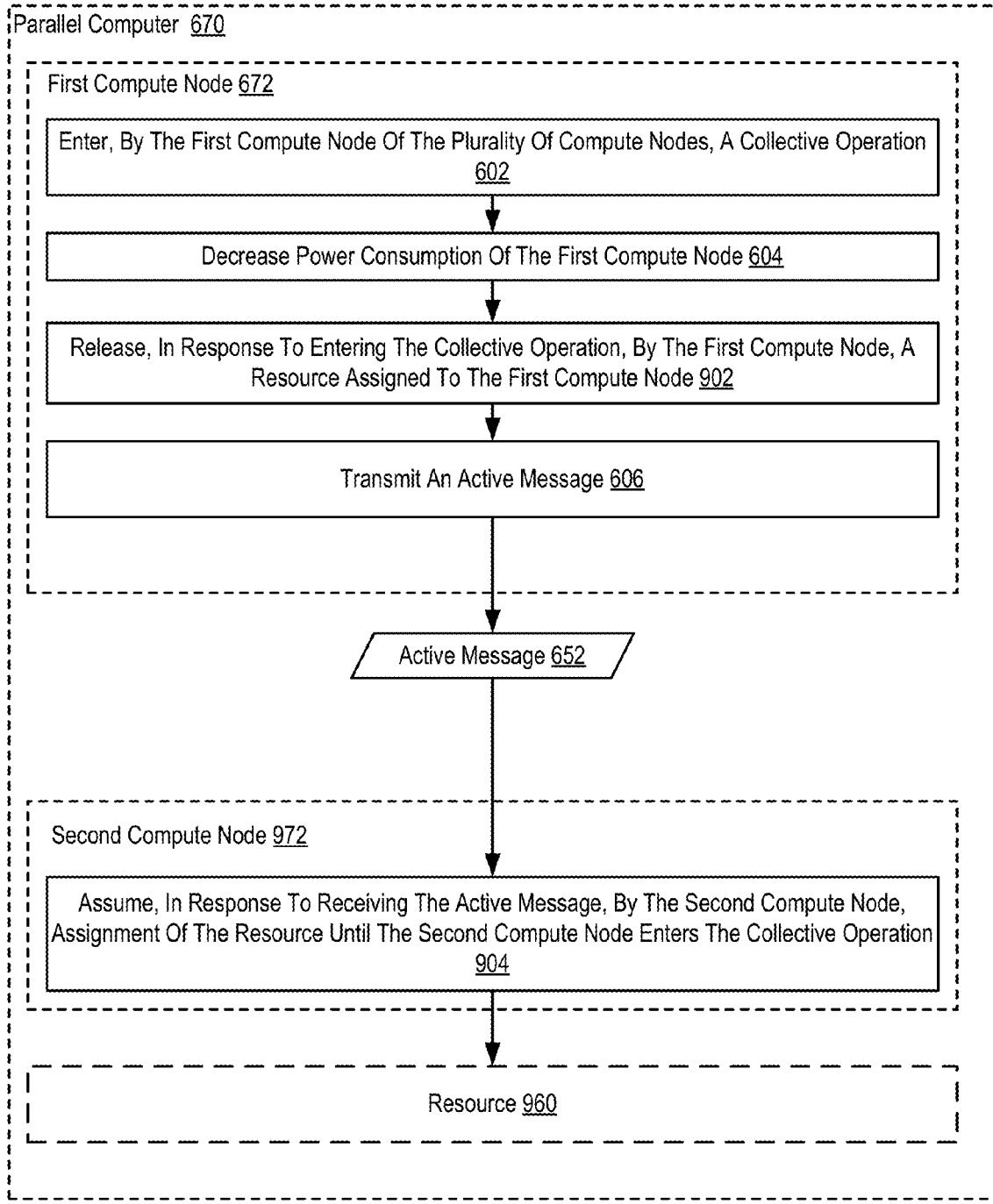
FIG. 9 sets forth a flow chart illustrating an additional example method for collective operation management in a parallel computer according to embodiments of the present invention.

For further explanation, FIG. 9 sets forth a flow chart illustrating another example method for collective operation management in a parallel computer (670) according to embodiments of the present invention. The method of FIG. 9 is similar to the method of FIG. 6 in that the method of FIG. 9 also includes a first compute node (672) entering (602) a collective operation (650); the first compute node (672) decreasing (604) power consumption of the first compute node (672) in response to entering the collective operation (650); and transmitting (606) to at least one of the other compute nodes of the plurality (674) of compute nodes, an active message (652) indicating that the first compute node (672) entered the collective operation (650).

The method of FIG. 9 includes the first compute node (672) releasing (902) a resource (960) assigned to the first compute node (672) in response to entering the collective operation (652). Releasing (902) a resource (960) assigned to the first compute node (672) in response to entering the collective operation (652) may be carried out by releasing a thread assigned to the first compute node.

The method of FIG. 9 also includes a second compute node (972) assuming (904) in response to receiving the active message, assignment of the resource (960) until the second compute node (972) enters the collective operation (652). Assuming (904) in response to receiving the active message, assignment of the resource (960) until the second compute node (972) enters the collective operation (652) may be carried out by transferring assignment of a processor thread to the second compute node; and assigning communication tokens.

Example embodiments of the present invention are described largely in the context of a fully functional computer system for collective operation management in a parallel computer. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of collective operation management in a distributed memory parallel computer, the distributed memory parallel computer including a plurality of compute nodes coupled for data communications over a data communications network, the method comprising:
    entering, by a first compute node of the plurality of multi-connected distributed compute nodes, a collective operation, wherein each compute node of the plurality of multi-connected distributed compute nodes is associated with the collective operation, the collective operation an operation that is executed simultaneously by all compute nodes in an operation group of compute nodes;
    decreasing, in response to entering the collective operation and prior to execution of a next task, by the first compute node, power consumption of the first compute node;
    in response to entering the collective operation, by the first compute node;
        transmitting to an identified set of compute nodes of the plurality of multi-connected distributed compute nodes, an active message indicating that the first compute node entered the collective operation; and
    releasing a resource assigned to the first compute node;
    receiving, by a second compute node in the identified set of compute nodes, the active message from the first compute node;
    in response to receiving the active message, increasing, by the second compute node, power consumption of the second compute node, wherein the power consumption of the second node is increased by an amount that is based on a number of active messages received; and
    after releasing the resource assigned to the first compute node and in response to receiving the active message, assuming, by the second compute node, assignment of the resource until the second compute node enters the collective operation.

2. The method of claim 1 wherein transmitting to an identified set compute nodes of the plurality of multi-connected distributed compute nodes, an active message indicating that the first compute node entered the collective operation includes transmitting the active message to each of the other compute node of the plurality of multi-connected distributed compute nodes.

3. The method of claim 1 wherein transmitting to an identified set of compute nodes of the plurality of multi-connected distributed compute nodes, an active message indicating that the first compute node entered the collective operation includes:
    identifying a set of compute nodes that have not entered the collective operation; and
    transmitting the active message to the identified set of compute nodes.

4. A method of collective operation management in a distributed memory parallel computer, the distributed memory parallel computer including a plurality of compute nodes coupled for data communications over a data communications network, the method comprising:
    entering, by a first compute node of the plurality of multi-connected distributed compute nodes, a collective operation, wherein each compute node of the plurality of multi-connected distributed compute nodes is associated with the collective operation, the collective operation an operation that is executed simultaneously by all compute nodes in an operation group of compute nodes;
    decreasing, in response to entering the collective operation and prior to execution of a next task, by the first compute node, power consumption of the first compute node;
    in response to entering the collective operation, by the first compute node:
        transmitting to an identified set of compute nodes of the plurality of multi-connected distributed compute nodes, an active message indicating that the first compute node entered the collective operation including:
            identifying a set of compute nodes that have not entered the collective operation; and
            transmitting the active message to the identified set of compute nodes; and
        releasing a resource assigned to the first compute node;
    receiving, by a second compute node in the identified set of compute nodes, the active message from the first compute node;
    in response to receiving the active message, increasing, by the second compute node, power consumption of the second compute node, wherein the power consumption of the second node is increased by an amount that is based on a number of active messages received; and after releasing the resource assigned to the first compute node and in response to receiving the active message, assuming, by the second compute node, assignment of the resource until the second compute node enters the collective operation.

\* \* \* \* \*